(No Model.)
J. SHOOLBRED.
CULTIVATOR.
No. 401,595. Patented Apr. 16, 1889.
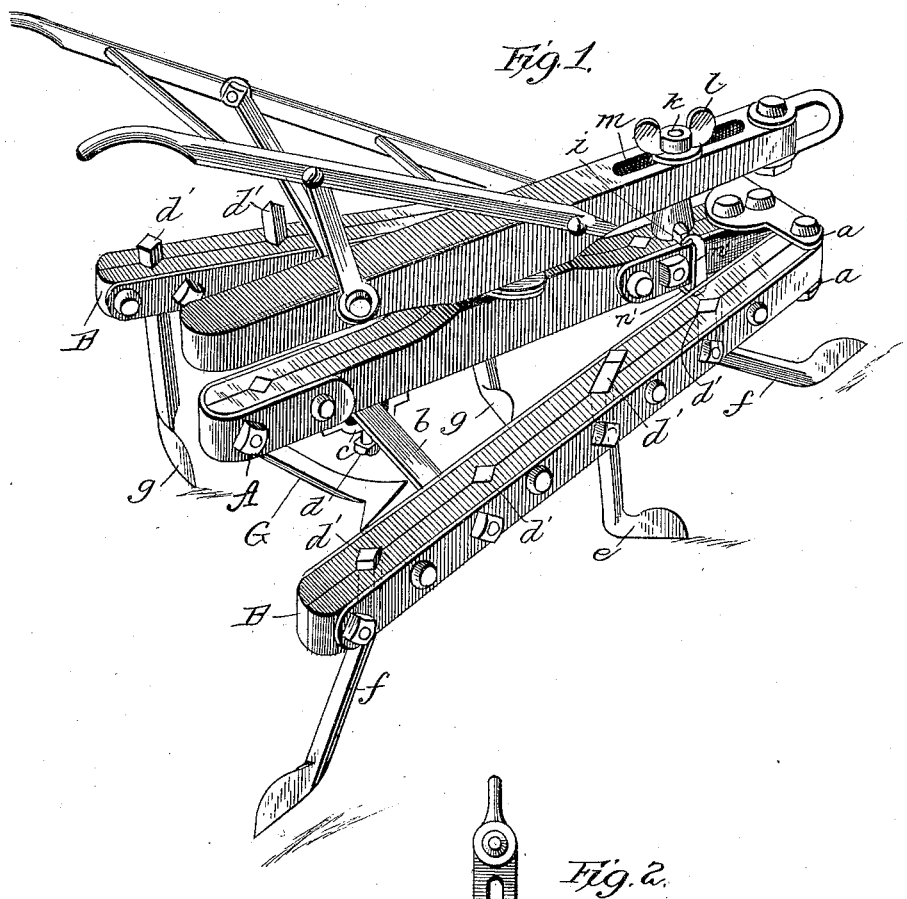
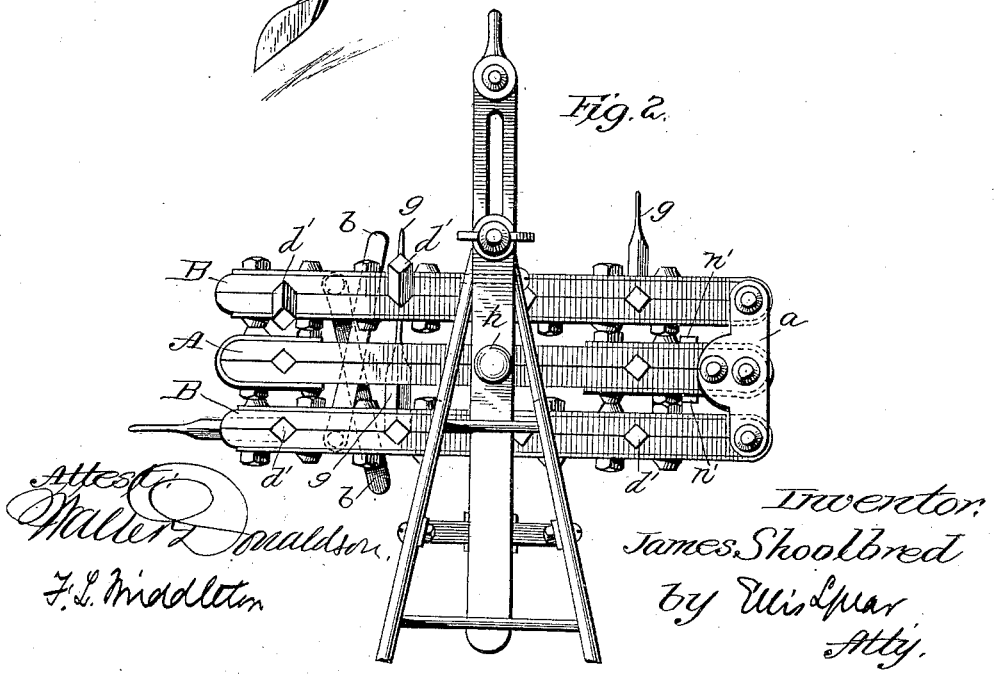

UNITED STATES PATENT OFFICE.

JAMES SHOOLBRED, OF EASTOVER, SOUTH CAROLINA.

CULTIVATOR.

SPECIFICATION forming part of Letters Patent No. 401,595, dated April 16, 1889.

Application filed December 6, 1888. Serial No. 292,808. (No model.)

*To all whom it may concern:*

Be it known that I, JAMES SHOOLBRED, of Eastover, in the county of Richland and State of South Carolina, have invented a new and useful Improvement in Cultivators; and I do hereby declare that the following is a full, clear, and exact description of the same.

My invention is a combined cultivator and harrow, and is designed to be used for the general preparation of the land before planting, and afterward in the general cultivation of all kinds of crops which require cultivation.

My object is to provide in one implement means for thoroughly harrowing and pulverizing the ground for cultivating or stirring up the soil between the rows of plants, and to render it adjustable as a cultivator, so that it may be worked between rows placed at different distances abroad, and also to provide adjustable teeth of a peculiar form adapted not only to pulverize and cultivate, but to sever roots and grasses and such obstructions in their passage over the same; and, further, to provide an adjustable draft-beam, by means of which different faces of the frame supporting the teeth may be presented to the land to be worked, and thus a different action of the teeth be secured.

My invention consists, principally, of the teeth-supporting frame and an adjustable draft-beam, whereby the frame may be drawn along longitudinally to the line of the draft-beam, or at right angles thereto, or at any intermediate angle, for the purpose of securing a different action of the teeth.

The invention further consists of a frame for supporting the teeth, composed of the central beam and pivoted wings with an adjustable draft-beam, whereby the implement is adapted to act upon a larger or smaller section of land at one time.

The invention further consists of teeth having cutting lower portions and angular shanks, whereby said teeth may be adjusted to change the action of the teeth upon the land.

The invention further consists in various details of construction, all of which are fully hereinafter described.

In the accompanying drawings, Figure 1 represents a perspective view of the implement with the beam arranged longitudinally of the frame and the wings or outer beams extended in the form of a cultivator. Fig. 2 represents the wings as closed with the draft-beam at right angles thereto in the form of a harrow.

In the drawings the teeth-supporting frame is shown as composed of three beams; but it will be understood that more or less may be used, as found desirable. The central beam of the three shown is represented at A and the two outer beams at B B. The central beam carries a yoke composed of two plates, $a$, at its forward end, and pivoted to the outer end of these plates between them, one upon each side of the central beam, are the outer beams or wings, B B. The beams B B may be swung out from the central beam at the rear, so as to make the implement in the form of the cultivator, or approximately V-shaped, and a support and guide is provided at the rear, consisting of two rods, $b\ b$, which pass through a guiding-loop, $c$, on the central beam, where they are held in any desired position by means of a set-screw, $d$. Each of the beams is shown as being split from one end to the other, and provided with square sockets, into which I have inserted corresponding shanks of the teeth $d'$. After these are inserted, the parts of the beams are fastened together by means of bolts, one passing on either side of each tooth. I do not limit myself, however, to this way of holding the teeth, as it is obvious that sockets may be formed without splitting the beam, and that the teeth may be held by set-screws. The beams may also be made of iron. The teeth shown are of peculiar form, and their construction makes them capable of being used for many purposes of cultivation. As shown, they are provided with lower cutting-edges in the shape of a blade having upper and lower cutting-edges, the sides being flattened. The shank is square in cross-section and the upper part is bent at an angle to the main or body part, and when the tooth is held by the bent portion the body of the tooth is held at an angle to the beam and the blade is approximately parallel with the ground. In this position, if the frame is drawn directly in line with the cutting-edge, the teeth will sever all roots or grasses which may be in the way. If, however, it is desired to have the cutting-edge in a more vertical position, then the shank of the tooth is clamped below the bent-up end, which thus brings the teeth in the position shown at $e$, the first position described being shown at $f$. Whether the implement be drawn backward or forward in these described positions of the teeth, the effect is about the same as in the case of the tooth shown at $e$—the cutting action will be effected to a certain extent, and in the case of the tooth $f$ it will bear down upon any obstruction and sever it without uprooting plants which may be in proximity thereto. In addition to severing the obstructions and grasses, it is of course desirable to thoroughly stir and pulverize the ground, and this is done by arranging some of the teeth, as shown at $g$, at an angle to the other teeth, or, in other words, with their flat surfaces presented to the line of travel.

It will thus be seen that some of the teeth are arranged in the line with the draft and others arranged at an angle thereto, and that the ground will be thoroughly pulverized and all obstructions removed, no matter in what direction the draft may be, for the teeth which are across the line of draft when the frame is moving in one direction will be in line with the draft when moved in the other direction, and the teeth which are in line in one direction will present their flat surfaces when the frame is moved in the other direction, so that at all times there will be one set of teeth to cut the obstructions and to mark out the line to be cultivated or harrowed, and the other set of teeth will thoroughly pulverize or cultivate the land. In cultivating, as the central part of the space is usually the hardest, I arrange at the rear part of the central beam a tooth in plow form, (shown at G,) which thus thoroughly breaks up the earth.

The draft-beam is swiveled to the central beam by a pin or bolt, $h$, secured to the draft-beam and passing through the central beam. Two circular plates, one secured to the draft-beam and one to the central beam, serve as a bearing, preventing excessive friction between the beams. This swiveling of the draft-beam on the central beam permits it to be adjusted at any angle, so that the toothed frame may be drawn over the land at different angles relatively to the draft-beam, and thus a different effect be produced by presenting the teeth in a different position to act upon the land, and thus in many instances the desired effect may be produced without requiring any adjustment of the teeth themselves.

When the draft-beam is arranged at right angles, as shown in Fig. 2, the implement may be used as a harrow, with the wings closed, or the central teeth may be removed and the teeth at each end retained, so as to straddle the row and work upon each side thereof, though this would require two horses. If, when it is used as a harrow, the relative position of the teeth would not pulverize sufficiently, then the wings could be spread, one or both, so as to change the relative position of the teeth, and thus secure the desired effect.

In order to hold the beam in any desired position, I provide a clamp, $i$, which is held upon the T-shaped end of the screw $k$, which passes through a slot in the forward part of the draft-beam, and is held by a thumb-nut, $l$. The ends of the T are slightly hook-shaped, and engage with the hooked end of a yoke, $n'$, which is removably held to the central beam in the normal position of the parts. By tightening the nut the clamp draws upon the yoke $n'$, and the beam is thus prevented from turning. When the beam is turned, the yoke $n'$ may be slipped on one of the wings, and thus hold the beam in the same manner. The draft-beam is slotted, as shown at $m$, so that the clamp may be moved out or in toward or from the end of the draft-beam, so as to bear upon some portion of the frame, whatever be its position. Ordinary handles are provided for the draft-beam, as shown at $n$, suitably braced.

It will be understood that the teeth may be arranged and combined in many different ways for many different purposes in the use of the implement upon farm work, and I will not therefore describe particularly all the uses to which the implement may be applied.

I claim as my invention—

1. In combination, the frame having teeth and a draft-beam swiveled to said frame and carrying the handle-bars, the said beam being adjustable to horizontally change the line of draft, and holding devices for said beam, substantially as described.

2. In combination, the frame composed of a series of bars having teeth, said bars being pivoted at their forward ends, the adjustable bars at their rear ends, whereby the said bars may be spread apart or set close together, and a draft-beam pivoted to one of said bars and having movement in a horizontal plane, and holding means therefor, substantially as described, whereby the toothed bars may be drawn longitudinally or laterally, as desired.

3. In combination with the beam, a tooth having a flattened lower portion or blade with a cutting-edge in a vertical plane, the angular and bent shank for said blade adapted to a socket in the beam, whereby the blade may be adjusted into the line of draft or across the same and the inclination of said vertical cutting-edge may be varied, substantially as described.

In testimony whereof I have signed my name to this specification in the presence of two subscribing witnesses.

JAMES SHOOLBRED.

Witnesses:
 THOS. P. WESTON,
 W. W. RAY.